United States Patent [19]

Selby

[11] 4,066,414

[45] Jan. 3, 1978

[54] ONE PIECE TUBE AND MICROSCOPE SLIDE MANIPULATIVE LABORATORY DEVICE

[76] Inventor: Donald Selby, 107 Ray St., Freeport, N.Y. 11520

[21] Appl. No.: 768,802

[22] Filed: Feb. 15, 1977

[51] Int. Cl.² .......................................... G01N 3/00
[52] U.S. Cl. ...................................... 23/259; 23/292
[58] Field of Search ................................ 23/259, 292

[56] References Cited

U.S. PATENT DOCUMENTS

| | | | |
|---|---|---|---|
| 2,664,403 | 12/1953 | Weichselbaum | 252/408 |
| 3,415,361 | 12/1968 | Adams, Jr. et al. | 206/221 |
| 3,750,645 | 8/1973 | Bennett et al. | 23/259 X |
| 3,914,985 | 10/1975 | Von Behrens | 23/230 B X |

*Primary Examiner*—Robert M. Reese
*Attorney, Agent, or Firm*—David H. Semmes

[57] ABSTRACT

A one piece tube and microscope slide manipulative laboratory device, for use in clinical procedures employing a liquid test specimen. The device is significantly characterized by a normally upright tubular reservoir which is structurally equivalent to a normal test tube, and particularly of the type used for specific gravity measurements in a urine analysis procedure. Frangibly connected to the lower end of the tubular reservoir is a microscope slide chamber, comprising closely spaced opposed planar walls of optically transparent material. The upper portion of the slide chamber is adapted for flow communication to the lower end of the superposed tubular reservoir. Between the microscope slide chamber, and the tubular reservoir, is a transition member having a bore to allow the flow communication between the reservoir and the slide chamber. The transition member is structurally adapted to act as a limiting constriction to the flow communication, whereby upon centrifugation of a urine sample, for example, heavier constituents will be collected in the slide chamber and thereby immediately available for microscope examination. Therefore, the device will function initially as a test tube, and allow any form of chemical analysis or specific gravity measurement to be initially made, and thereafter, upon a centrifugation, the microscope slide, containing heavier constituents of the specimen, may be simply frangibly detached and subjected to immediate further microscope or other form of optical analysis.

15 Claims, 8 Drawing Figures

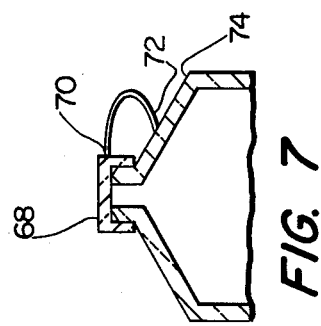
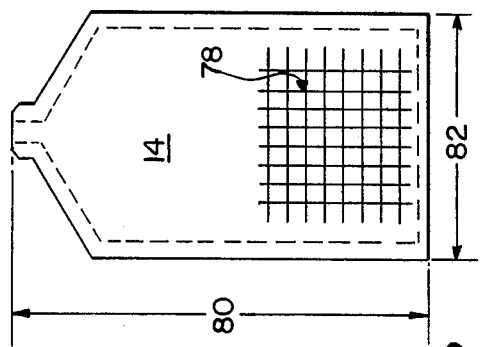
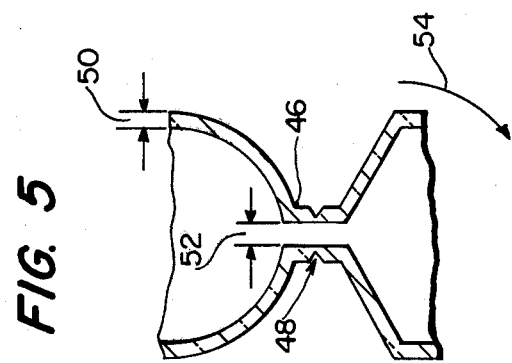
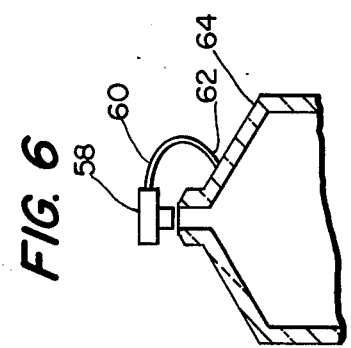
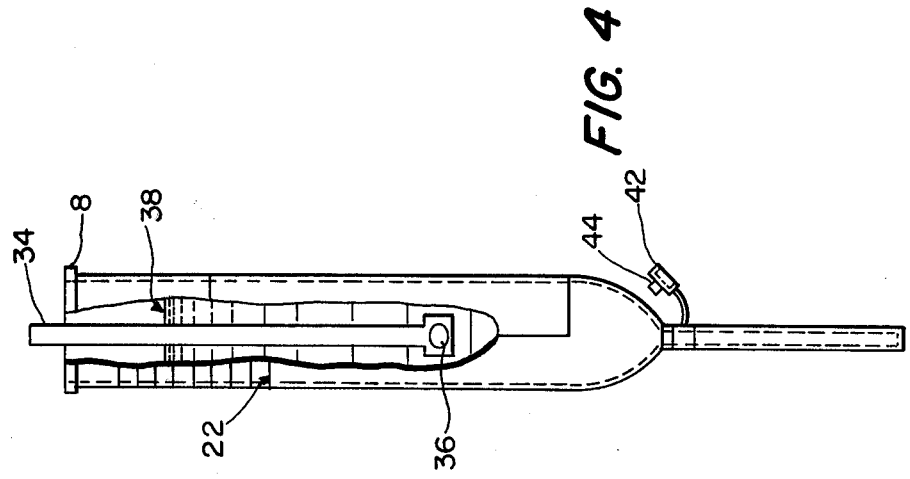

ONE PIECE TUBE AND MICROSCOPE SLIDE MANIPULATIVE LABORATORY DEVICE

BACKGROUND OF THE INVENTION

1. Field of the Invention:

A one piece tube and microscope slide manipulative laboratory device for use in clinical procedures, and particularly the labor intensive clinical procedure of urinalysis. Urinalysis technique minimally requires that a urine specimen be first tested for specific gravity, which is an important indicator of kidney function and the regulation of electrolyte concentration in patients receiving intravenous fluid therapies. Secondly, urinalysis requires the analysis of any sediment which may be present in the urine, since sediment is an indication of various pathologies in the patient, and the urine sediment is necessarily prepared in a slide for placement under a microscope objective. The present invention, therefore, is a one piece tube and microscope slide manipulative laboratory device which is a one tube system for both measuring specific gravity and performing a microscopic examination, without the need for such labor-intensive operations as a separate decanting of the sediment from the specimen after it has been centrifuged to collect the sediment.

2. Description of the Prior Art

A search of prior art patents concerned with manipulative laboratory devices for use in clinical procedures employing a test specimen, and particularly clinical procedures involving urinalysis, has developed the U.S. Pat. Nos., as follows: WEICHELSBAUM 2,664,403,
   NATELSON 2,685,800,
   ADAMS 3,415,361,
   SHAW 3,460,395,
   FODERICK 3,543,743,
   REID 3,641,825,
   ERICKSON 3,642,450,
   PRICE 3,666,421,
   SMITH 3,682,321,
   CLARKE 3,705,011,
   SPECK 3,753,863,
   SEIDLER 3,774,455,
   BAUER 3,811,840,
   VON BEHRENS 3,914,985,
   YEE 3,955,928.

There is not found in the prior art a one-tube device which allows for a specific gravity, or chemical, examination as an initial step, with the automatic preparation of microscopic slide as the result of a subsequent centrifugation. None of the above-noted patents disclose a one-tube system for urinalysis, wherein a separable microscopic slide is filled with urine sediment, simultaneously with a centrifugation of the entire device.

The patent to Seidler illustrates a urine testing apparatus, though one that requires a separate decanting of urine in order to remove sediment for further analysis, for example, in the lid shown in FIG. 5. Seidler also shows the use of a cap, 31, at FIG. 6, but his cap requires a manual filling with sediment, and does not function as a microscopic slide for immediate microscopic analysis of collected sediment.

The patent to Von Behrens illustrates a centrifugation device specifically illustrated for use with blood serum analysis, though with mention that it may be useful for other biological fluids, such as urine. Von Behrens also employs a contruction having multiple parts, wherein a separable inner capillary, 13, is cushioned by a fluid contained within a outer tube 11. In the embodiment of FIG. 6, as explained at col. 8, lines 25 et seq., when the device is intended to be used for urine, for example, the closed-up capillary tube, 13, as shown in FIG. 6, is preferred. However, use of the device taught by Von Behrens requires both an initial centrifugation, and a subsequent high speed centrifugation. Furthermore, the capillary tube 13 is neither structurally nor functionally equivalent to a preformed planar microscopic slide. The other abovelisted patents are considered less pertinent that either Seidler or Von Behrens, and are noted primarily to illustrate various known constructional features of manipulative laboratory devices.

Bauer illustrates a disposable specimen testing device, wherein a wick which is contained in a substantially flat surface portion of a fluid impervious sheath, having an aperture therethrough. This, then, is a "dip and read" device, which is significantly characterized by the addition of a wick structure, and is merely illustrative of a slide-type of testing device.

The patents to Reid, Foderick, and Shaw illustrate various types of urinometers, wherein a container is structured to allow for measuring the specific gravity of a urine sample volume. Of course, these devices are adapted only for performing a specific gravity measurement function, and do not also allow for a single-tube development of a microscopic slide, upon a subsequent centrifugation.

The patents to Ericksson, Price, and Adams illustrate manipulative laboratory devices characterized by unitary containers for allowing specific reagents to mix with a biological fluid. As such, these three devices merely illustrate prepackaged laboratory devices. The patent to Price particularly illustrates a test slide which is both disposable and inclusive of quantities of test reagents. The patent to Adams similarly requires application of aliquots of a fluid to be tested, and at FIG. 1 illustrates a cap, integrally formed with the main body of a vessel, and hinged by a notched bridge, at 36.

The patents to Weichelsbaum and Natelson are noted to illustrate manipulative laboratory devices that are frangible, at a particular cross-sectional area. As such, they simply illustrate known techniques for insuring a frangible connection in a laboratory device.

The patent to Smith illustrates a plastic filter assembly, which allows for certain urine analysis procedures without the necessity for centrifuging. As such, it is noted primarily to illustrate yet another approach to a disposable urinalysis device. Similarly, the patents to Clark, Speck, and Yee illustrate urinalysis techniques, and particularly techniques wherein a urine sample is ultimately evaluated by an optical density determination. These patents are noted merely to illustrate particular chemical reagent mixing techniques in the art of urinalysis, wherein conventional test tubes are used as the specimen container.

In summary, no prior patent is known which teaches a one-tube assembly specifically adapted for urinalysis, and one characterized by a test tube type reservoir having an optically clear plastic microscopic slide frangibly connected to its lower extremity.

SUMMARY OF THE INVENTION

The present invention is a disposable manipulative laboratory device for use in clinical procedures employing a test specimen, and particularly a one-piece tube and microscope slide assembly which allows for at least two clinical procedures to be performed within the same device. The present invention has particular utility in the art of urinalysis, wherein clinical procedure requires that a urine sample specimen be initially tested at least for specific gravity, and thereafter sediment collected from the specimen, by centrifugation, for microscopic analysis. The present invention allows a laboratory operator to simply pour the urine specimen into the present device, make his specific gravity measurement by conventional technique, using a hygrometer, and then synergistically obtain a prepared microscope slide of sediment by placing the entire device in a centrifuge. On centrifugation, the supernatant liquid may be simply discarded, either before or after the prepared microscope slide has been frangibly separated from the device.

Therefore, the present invention is a one-tube system to allow a liquid specimen to be first measured for specific gravity, with automatic preparation of a microscope slide for sediment collected upon a centrifugation of the entire device. The device is characterized by a normally upright tubular reservoir, having an open end for receiving the specimen, and a lower end adapted for flow communication from the reservoir. The device is also significantly characterized by a microscope slide chamber comprising closely spaced opposed planar walls of optically transparent material, with the slide chamber having an upper end adapted for flow communication into the slide chamber. Between the microscope slide chamber and the tubular reservoir, is a transition member, which has a particularly formed bore and wall thickness. The bore acts as the conduit between the reservoir and the slide chamber, and the wall thicknesses defining the bore may act as a seal against further flow communication between the reservoir and the microscope slide. The construction of the transition member has significant structural characteristics, so that the entire device will be able to withstand the centrifugal forces subjected to it during a centrifugation, while yet be defined to allow a quick and sure frangible separation of the microscope slide. The bore is illustrated in a preferred embodiment to be rectangular in cross-section, with the longer side of the rectangle being defined by walls which are in substantial alignment with, and extending from, the planar walls of optically transparent material which define the microscope slide chamber. The planar walls of the slide chamber are preferably mutually parallel about a vertical plane of symmetry of the entire device, and further the planar walls of the slide may conveniently be substantially rectangular. The optically transparent walls of the slide are interconnected, between their outer edges, by narrow web portions of the same optically transparent material, and the upper web portions preferably extend inwardly, and upwardly, from a top surface of the slide chamber to meet with a second pair of vertically disposed wall thicknesses; with these second wall thicknesses preferably defining the longer dimension of the rectangular bore. The second vertically disposed wall thicknesses are preferably configured to be frangible, either by their inherent dimensions or with the further provision of a notch to define a weakened section.

The entire device is adapted to be manufactured in one piece, by a molding operation, and is preferably of an optically transparent plastic material. The plastic must be rigid, or semi-rigid, to allow for the frangible separation. Hence, the materials used to mold the entire device may be of any such type, and include such plastics as polyvinylchloride, polyethylene, or polypropylene, for example. All of these exemplary polymeric film-forming materials may be easily made optically transparent, and rigid, and since the specimen is aqueous in nature, it is apparent numerous other water-impervious resinous materials may be used, without departing from the invention.

Each of these types of optically transparent plastic materials may be compounded to undergo a certain amount of localized flow, upon a flexure. This characteristic allows the present invention to have a frangible connection with dimensions such that, upon a frangible separation of the microscope slide from the tubular reservoir they also function to seal off the microscope slide, with a thin web of deformed plastic in the vicinity of the frangible wall section. Alternatively, the frangible section may be configured so that the frangible separation leaves the bore substantially open, after being broken away, and a separate cap member may be advantageously molded to the device, in the vicinity of the frangible connection, to allow a simple capping of the microscope slide after the separation.

Accordingly, it is the primary object of the present invention to provide an improved manipulative laboratory device for use in clinical procedures employing a test specimen, and particularly one configured to allow a specific gravity measurement of the specimen, with the subsequent production of a microscope slide upon centrifugation of the entire device.

It is also an object of the present invention to provide an improved urine testing apparatus which is portable, disposable, and adapted to allow both a specific gravity measurement and a collection of sediment in a microscope slide to be accomplished without removing the urine specimen from the device.

It is a further object of the present invention to provide a one-piece tube and microscope slide manipulative laboratory device which requires no special skill on the part of the clinical technician, since the sediment-containing microscope slide is automatically developed upon centrifugation of the entire device.

Yet another object of the present invention is to provide a one-piece device comprised entirely of a transparent plastic material, so that characteristics of the material can be taken advantage of to seal a microscope slide after it has been frangibly disconnected.

As will become more apparent hereinafter, the invention is capable of economical mass production, and incapable of being used for more than one specimen. Further objects, advantages and features of the present invention will become apparent with reference to the following detailed description, wherein reference is made to the accompanying drawings of the preferred embodiment.

BRIEF DESCRIPTION OF THE DRAWINGS

FIG. 4 illustrates, in partial section, use of the present invention with a weighted float, for performing specific gravity measurements on a biological fluid specimen;

FIG. 5 is a detailed sectional view showing one form of frangible wall section usable with the present invention;

FIGS. 6 and 7 illustrate two forms of caps which optionally may be employed in the present invention;

FIG. 8 is a view showing a modification for the microscope slide which is an integral part of the present invention.

Figure 1:
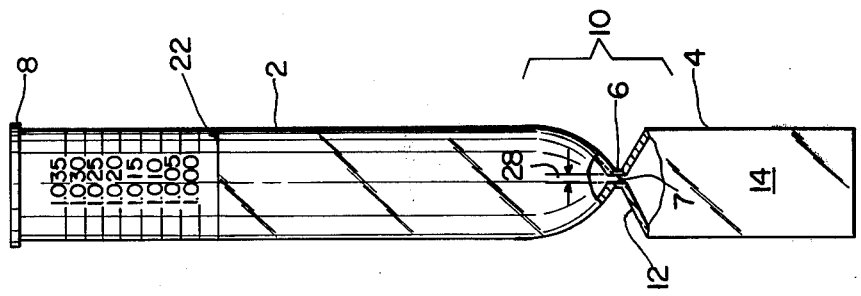
FIG. 1 is a front view, partially in section, of a urine testing apparatus constructed in accordance with a preferred embodiment of the present invention.

DESCRIPTION OF THE PREFERRED EMBODIMENTS:

The one-piece tube and microscope slide manipulative laboratory device taught herein is preferably molded in one piece of transparent plastic material. The first form of the device 10 is shown in FIG. 1, and consists of a normally upright tubular reservoir, 2, and a microscope slide chamber, 4. Between these two elements is a transition member, 6, which is spaced between the lower end of the reservoir and the upper end of the slide chamber. The transition member is particularly configured to have a bore, 28, for float communication from the reservoir, 2, and into the microscope chamber, 4.

The device is completely unitary, and well adapted to manufacture by conventional plastic molding procedures. Since the microscope slide, 4, is defined primarily by closely spaced opposed planar walls, 14, 16, it is advantageous to mold the entire device from an optically transparent plastic material. As has been noted, any form of resinous plastic material which is both optically transparent, as required for the microscope slide wall, 14, 16, and also rigid or semirigid, to allow easy frangible separation of the slide from the reservoir portion, is acceptable. The plastics which have these attributes, and are also resistent to such biological fluids as urine, include polyvinylchloride, polyethylene, and polypropylene, for example. Additional plastic resins may include polystyrene, cellulose propionate, as well as fluorocarbon-type plastic materials.

Figure 3:
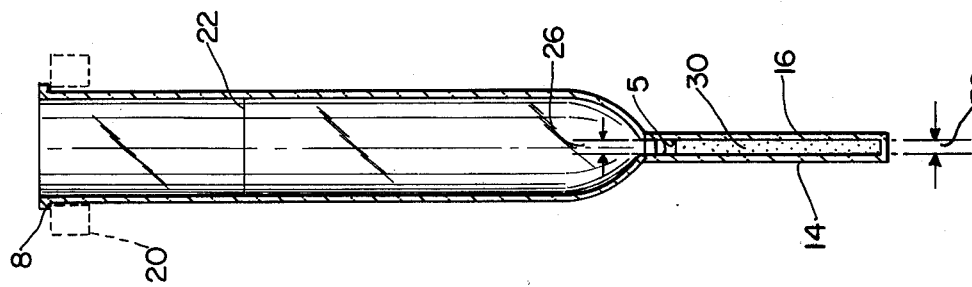
FIG. 3 illustrates a sectional view of the embodiment of FIG. 1, wherein the section is perpendicular to one vertical plane of symmetry of the device.
Figure 2:
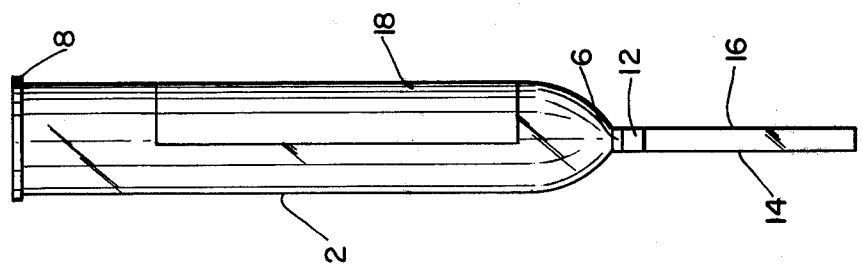
FIG. 2 illustrates an external side view of the embodiment of FIG. 1.

In the preferred embodiment which is variously illustrated in front view at FIG. 1, and in side view at FIG. 2, the transition number 6 defines the region for a frangible neck, with the frangible section being defined by a wall thickness which also constitutes at least one boundary for the flow communicating bore, 28. According to the preferred embodiment, the planar walls of the microscope slide are substantially rectangular, with the first planar wall, 14, being parallel and slightly spaced from a vertical plane of symmetry for the entire device which is equivalent to the plane of the drawing, in FIG. 1. The two rectangular planar walls of the slide are interconnected, between their edges, by narrow web portions as shown between walls 14 and 16 in FIG. 2, wherein the upper web portions, 12, extend inwardly, and upwardly, from a top surface of the slide and meet second vertically disposed wall thicknesses which define the transition member. The transition member, then, is defined by first vertically disposed wall thicknesses, 5, as shown in FIG. 3, and also by second vertically disposed wall thicknesses, 7, as shown in FIG. 1. The bore may have a rectangular cross-section by this construction, so that the narrower leg of the rectangular bore may have a dimension as shown at 28 in FIG. 1. As shown in FIG. 3, the longer dimension of the bore, 26, may be defined by the spacing of the first wall thicknesses, 5. In this manner, the first wall thicknesses of the transition member, 5, may be defined by vertically extending the wall thicknesses, 14 and 16, which are mutually parallel to a vertical plane of symmetry for the device. As shown in FIGS. 1 and 3, the wall thickness for the reservoir portion, 2, and the microscope slide portion, 4, are substantially identical to the wall thicknesses in the transition member. For purposes of illustration, the entire device may be comprised with wall section thicknesses on the order of 0.1 centimeters, so that the planar walls, 14, 16, of the microscope slide may be spaced apart to define a chamber which is 0.2 centimeters, as at 32. The longer dimension of the transition bore, 26, may also be on the order of 0.2 centimeters, with a flow restriction function for the transition bore being substantially controllable by the correspondingly narrower dimension for the rectangular bore, or the dimension shown as 28 in FIG. 1. The transition wall thicknesses must have sufficient structural integrity so that there is no danger that the microscope slide wall be accidentally detached when the entire specimen is being rotated in a centrifuge, and for this purpose, the reservoir portion, 2, may have an extending lip portion, as shown at 8 in FIG. 3. The lip, 8, conveniently allow the entire device to be supported upon the holder of a centrifuging rack, and a rack holder is illustrated in FIG. 3 in phantom, at 20. Even though the respective wall thicknesses defining the transition member are sufficient to resist the centrifugal forces developed during the centrifugation operation, the structure of the transition member is such that a frangible detachment of the microscope slide is still readily accomplished. For example, as shown in FIG. 1, the tube is shown in a normal upright position, and the microscope slide includes a shoulder 12 which extends upwardly and inwardly to the transition member, 6. For example, if the microscope slide wall, 14, as shown in FIG. 1, has a vertical dimension of approximately 4 centimeters, and a horizontal dimension of approximately 1.8 centimeters, an operator may hold that horizontal dimension between his fingers, and move the entire slide sideways, in the vertical plane of symmetry, in order to effect the frangible disconnection. The frangible disconnection will be facilitated by such a sideways manipulation, since a large bending moment can be exerted on walls, 7, by grabbing the wider horizontal dimension of the microscope slide. In the preferred embodiment of FIG. 1, the tubular reservoir portion, 2, may have a vertical dimension of approximately 10 centimeters, so the entire device has a vertical dimension of approximately 14 centimeters. It should be noted that the outside diameter of the tube portion is substantially equal to the outside diameter of the microscope slide portion, both being approximately 1.8 centimeters, so that the entire device may be easily held by a conventional rack on a centrifuge, as further illustrated in FIG. 3.

As has been noted, the narrowest dimension of the rectangular bore, as shown at 28 in FIG. 1, may be varied in order to define the amount of flow restriction. For purposes of illustration, the dimension 28 may be narrowed to constitute a near capillary size, and effective values for the dimension 28 may be between 0.02 centimeters and 0.2 centimeters. It should be emphasized that the device may be configured so that a liquid specimen which is poured into the reservoir 2, may either initially fill only the reservoir, due to a capillary effect at the transition bore, or the transition bore may be sized so the entire internal volume of the device is initially filled with the specimen.

FIG. 4 illustrates the use of this device for a urine analysis technique, wherein a weighted float, 34, is shown partially immersed in a urine sample. In operation, the reservoir portion may include indicia on its outer surface, with the indicia including a fill line, 22, and values spaced above the fill line which indicate the specific gravity of the urine sample when a float of known specific gravity is inserted into the open upper end of the tubular reservoir. In FIG. 4 the initial fluid level is shown to have been raised to the final fluid level, 38, by the displacement function of the float, 34. Alternatively, the float 34 may be a hygrometer, wherein the indicia for indicating specific gravity will be directly inscribed on the shaft of the hygrometer tube. If either a float, 34, or a functionally equivalent hygrometer is used, the operator will nonetheless be able to quickly and easily determine a specific value for the urine sample. In the preferred embodiments, the specific gravity indicia is preferably molded on the reservoir wall, thereby allowing a convenient fill reference line, 22, so that the operator will know that he is putting in, for example, 10 cubic centimeters of a urine specimen. Additionally, the float 34 may be simply constructed with a weighted end, 36, and the float may also be part of the entire disposable package.

To insure correct identification of the specimen with a patient, the reservoir wall may also include a frosted plastic surface to allow patient information to be directly recorded thereon. Alternatively, a label, 18, may be supplied.

FIG. 4 illustrates that a separate cap, 42, may be molded through a bridge portion, 44, directly to an exterior surface on the device. In FIGS. 6 and 7, two types of caps for sealing the bore of the microscope slide, after detachment, are further illustrated. In FIG. 6, the cap, 58, includes a web portion, 60, which may be formed so as to be flexible and connected to the sloping wall of the microscope slide, as at 62. Alternatively, the cap may be as shown in FIG. 7, wherein the cap 68 engages around the outside of the transition member, and conveniently molded with the entire device by a web portion which is connected to the cap, at 70, and to the microscope slide, at 72. The inwardly extending web portion of the microscope slide, shown in section at 64 in FIG. 6, and at 74 in FIG. 7, is a convenient place for attaching such a cap device, since it will be located proximate the transition member and within the external confines of the dimensions of the device.

It should be noted that the use of a integrally formed cap is optional and its need or desirability is dependent upon the dimensions of the transition bore, and the plastic material used to mold the entire device. FIG. 5 illustrates, in a more detailed view, that the bore dimension, 52, may be less than the thickness of the respective second wall thicknesses, 46, and tube wall thickness 50. If the microscope slide is either frangibly detached, as shown by the arrow, 54, or twisted in any skewed manner, there will be some local deformation of the plastic comprising the walls of the transition member. To assist this plastic deformation of the plastic material, the first or second wall thicknesses defining the bore may include a notch, 48, so that upon the application of a moment of force, there will be a tendency for the plastic in the immediate vicinity to deform and seal the bore. For example, if the frangible deconnection is accomplished by rotating the microscope slide about the center line of the entire device, the respective first and second walls which define the transition member will be twisted, and capable of sealing the bore as the failure point of the deformed plastic is reached. If such a plastic deformation is desired in order to seal the microscope slide, the plastic material chosen may be slightly more ductile than would be chosen if a relatively clean frangible disconnection were desired for a particular application.

FIG. 8 illustrates that the microscope slide may include a grid, 78, on either or both of the planar walls, 14. The horizontal dimension, 82, may preferably be approximately 1.8 centimeters, with the vertical dimension, 80, being approximately 4 centimeters. These dimensional relationships will allow a one centimeter grid, 78, to be molded into the transparent wall, 14, and such a grid may be employed to further facilitate classification of the sediment, 30, which has been located within the slide chamber.

In the preferred embodiments, as most easily illustrated in FIG. 5, the pair of first vertically disposed walls thicknesses, 5, are disposed as extensions of the optically transparent planar walls of the microscope slide, 14, 16. In the preferred embodiment, the bore through the transition member is preferably rectangular, though the size and shape of the bore may clearly be configured into any equivalent shape. Because the present invention includes a transition member which is substantially close to the center line of the device, whatever shape is given to the wall thicknesses of the transition member the geometry of the upwardly extending web portions on the microscope slide will enhance the ability of an operator to apply a sufficient bending moment to the transition member to affect a positive frangible disconnection.

While various embodiments of my invention have been shown and described, it is to be understood that the invention is solely to be limited by the scope of the appended claims.

I claim:

1. A one piece tube and microscope slide manipulative laboratory device for use in clinical procedures employing a test specimen, comprising, in combination;
   A. A normally upright tubular reservoir having an open end for receiving the specimen, and a lower end adapted for flow communication from said reservoir, and;
   B. A microscope slide chamber comprising closely spaced opposed planar walls of optically transparent material, said chamber having an upper end adapted for flow communication with said chamber, and;
   C. A transition member spaced between the lower end of said reservoir and the upper end of said slide chamber, said transition member having a bore for flow communication and a wall thickness defining a frangible section, between said reservoir and said slide chamber, whereby said device is operable to allow a specimen within said reservoir to be centrifuged, so that heavier constituents are collected in said slide chamber, which then may be frangibly separated from said reservoir.

2. A manipulative laboratory device as in claim 1, whereby said device further includes a separate cap means, which is proximate the transition member and adapted to seal said microscope slide after it has been frangibly separated.

3. A manipulative laboratory device as in claim 2, whereby said cap is itself frangibly connected to an exterior surface of said device.

4. A manipulative laboratory device as in claim 1, wherein said tubular reservoir has a centerline which is normally disposed vertically whereby said device is symmetrical about a vertical plane, wherein further the planar walls of said microscope slide chamber are mutually parallel about said vertical plane.

5. A manipulative laboratory device, as in claim 4, wherein the frangible section of the transition member includes a bore which is rectangular in cross-section and defined by vertically extending first opposed wall thicknesses which are spaced about said vertical plane, in substantial alignment with, and extending from, said planar walls of said microscope slide, and second vertically disposed wall thicknesses.

6. A manipulative laboratory device as in claim 5, wherein the planar walls of said slide are substantially rectangular and interconnected, between their edges, by narrow web portions to define said microscope slide chamber, wherein upper web portions extend inwardly, and upwardly, from a top surface of said chamber and meet said second vertically disposed wall thickness of said transition member.

7. A manipulative laboratory device as in claim 6, wherein said second vertically disposed wall thicknesses comprise said frangible section.

8. A manipulative laboratory device as in claim 1 wherein said transition member bore has a flow cross section which defines a limiting constriction to flow communication between said reservoir and said microscope slide.

9. A manipulative laboratory device as in claim 8, wherein said frangible section of the transition member includes a bore which is rectangular in cross-section and defined by vertically extending first opposed wall thicknesses which are spaced about a vertical plane, in substantial alignment with, and extending from, said planar walls of said microscope slide, and second vertically disposed wall thicknesses.

10. A manipulative laboratory device as in claim 9, wherein the planar walls of said slide are substantially rectangular and interconnected, between their edges, by narrow web portions to define said microscope slide chamber, wherein upper web portions extend inwardly, and upwardly, from a top surface of said chamber and meet said second vertically disposed wall thicknesses of said transition member.

11. A manipulative laboratory device as in claim 10, wherein said second vertically disposed wall thicknesses comprise said frangible section.

12. A manipulative laboratory device as in claim 1, wherein said optically transparent material is an optically transparent resinous material.

13. A manipulative laboratory device as in claim 12, wherein said resinous material is a plastic that is semi-rigid, with flow characteristics that allow localized deformation and consequent sealing of said bore upon said frangible separation.

14. A manipulative laboratory device as in claim 13, wherein said frangible section of the transition member includes a bore which is rectangular in cross-section and defined by vertically extending first opposed wall thicknesses which are spaced about a vertical plane, in substantial alignment with, and extending from, said planar walls of said microscope slide, and second vertically disposed wall thicknesses.

15. A manipulative laboratory device as in claim 14, wherein said second vertically disposed wall thicknesses comprise said frangible section.

* * * * *